Oct. 5, 1926.
C. C. SPREEN
1,602,177
SEAL
Filed Sept. 29, 1924
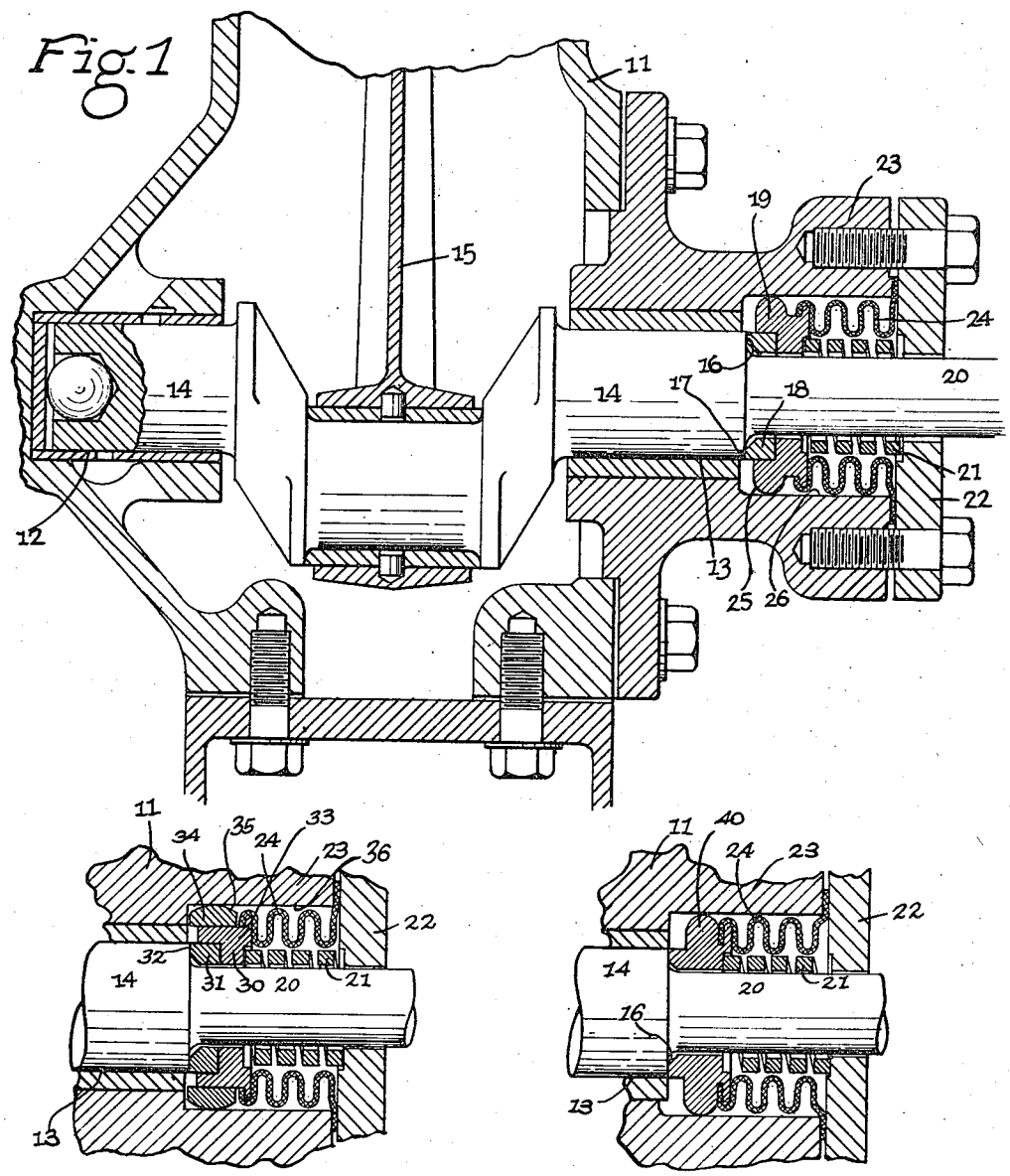
Fig.1
Fig.2
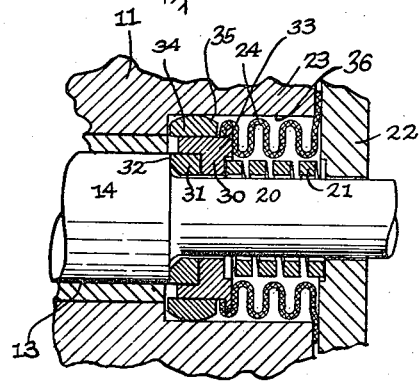
Fig.3
Charles C. Spreen
Inventor
by
Smith and Freeman
Attorneys.

Patented Oct. 5, 1926.

1,602,177

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

SEAL.

Application filed September 29, 1924. Serial No. 740,611.

In Patent 1,499,740 issued July 1, 1924, for compressors for refrigerating machinery invented by Frederick H. Kolbe of Detroit, Michigan, there is shown a seal for the crank shaft opening of a compressor. In actual practice I have found that this seal operates to effectively seal the crank shaft opening but is likely to wear rapidly probably because of the tendency of the sealing spring to force the ring out of alinement. My invention is intended to overcome this defect and in the drawings accompanying this specification and forming a part thereof I have shown, for purposes of illustration, three forms which my invention may assume. In these drawings:

Figure 1 is a general view showing one form of my invention,

Figure 2 is a fragmentary view showing a second form of my invention, while

Figure 3 is a similar fragmentary view showing the third form of my invention.

In Figure 1 of the drawings I have shown the lower portion 11 of the compressor casing and have shown this casing 11 provided with a closed bearing 12 and an open end bearing 13 arranged to jointly support a crank shaft 14 which receives between the bearings the usual connecting rod 15, projects beyond the open end bearing 13 to receive a suitable driving connection, and is provided with an annular shoulder 16 having its transverse face arranged to be abutted and sealingly engaged by the transverse face 17 of the contact portion 18 of a sealing ring 19 which surrounds the reduced extension 20 of the shaft 14, is urged against the shoulder 16 by a compressed spring 21 encircling the shaft 20 between the ring 19 and a plate 22 bolted to a tubular projection 23 extending from the casing 11 about the shaft extension 20 and spring 21, and is sealed to the casing 11 by a bellows 24 sealed at one end to the ring 19 and at the other end clamped securely between the plate 22 and the tubular projection 23. The ring 19 herein shown is provided with an exterior surface 25 arranged to engage the interior face 26 of the tubular projection 23 to permit the tubular projection 23 to support the sealing ring 19 firmly and accurately in position but rounded to reduce the engaging surfaces of the ring 19 and projection 23 to substantially a line to thereby permit slight play between the ring 19 and projection 23 to prevent binding resulting from inaccuracies in the formation of the parts and particularly in the angle of the shoulder 16 to the axis of the shaft 14.

The devices shown in Figures 2 and 3 comprise the same casing 11, shaft 14, open end bearing 13, shaft extension 20, tubular projection 23, plate 22, spring 21, bellows 24, and shoulder 16, but in the device of Figure 2 there is substituted for the ring 19 of Figure 1 a ring 30 comprising a bearing portion 31 provided with a face 32 cooperating with the shoulder 16, a supporting and carrying portion 33 supporting and carrying the bearing portion 31, and a separate guiding portion 34 provided with a rounded external face 35 for engaging the interior face 36 of the tubular projection 23; while in Figure 3 there is substituted for the sealing ring 19 of Figure 1 a sealing ring 40 having the same functions and external form as the sealing ring 19 of Figure 1 or the sealing ring 30 of Figure 2 but formed in one single piece.

It will be obvious to those skilled in the art that in the devices herein shown the sealing ring is accurately and positively supported against lateral movement by the tubular projection and therefore by the casing itself and that the excessive wear resulting from this lateral movement is thereby prevented; that this support is at the same time arranged to permit slight play between the sealing ring and the tubular projection to prevent binding of the ring on the projection resulting from inaccuracies in the parts and effective to cause unequal wear on the sealing ring and the shaft shoulder; and that the devices herein shown therefore accomplish the purpose of my invention and overcome what is apparently the only defect in the construction shown in the Kolbe patent. In addition, it will be obvious to those skilled in the art that my invention may be embodied in forms other than the three herein shown and that these embodiments may all be variously changed and modified without departing from the spirit of my invention or sacrificing the advantages thereof. It will therefore be understood that this disclosure is illustrative only and that my invention is not limited thereto.

I claim:—

A compressor comprising a casing provided with a drive shaft aperture, a drive shaft passing through said aperture and provided with an annular shoulder, a sealing ring provided with a transverse face arranged to sealingly engage the transverse face of said shoulder, a spring arranged to press said ring against said shoulder, an imperforate tubular projection extending from said casing surrounding said shaft and said shoulder, said ring being provided with an annular face engaging the inner wall of said tubular extension over an annular surface of minimum width whereby said projection supports and guides said ring while still permitting tilting of said ring without binding between said ring and said projection, means carried by said projection forming an abutment for said spring, and a bellows extending between said ring and the end portion of said projection to seal said ring to said casing.

In testimony whereof, I hereunto affix my signature.

CHARLES C. SPREEN.